United States Patent
Marsolais et al.

(10) Patent No.: US 11,728,570 B2
(45) Date of Patent: Aug. 15, 2023

(54) ELECTROMAGNETIC BANDGAP ISOLATION SYSTEMS AND METHODS

(71) Applicant: Teledyne FLIR Surveillance, Inc., Wilsonville, OR (US)

(72) Inventors: Alexandre Marsolais, Laval (CA); Patrick Lamontagne, Laval (CA); Pierre Poitevin, Laval (CA)

(73) Assignee: Teledyne FLIR Surveillance, Inc., Wilsonville, OR (US)

( * ) Notice: Subject to any disclaimer, the term of this patent is extended or adjusted under 35 U.S.C. 154(b) by 581 days.

(21) Appl. No.: 16/802,065

(22) Filed: Feb. 26, 2020

(65) Prior Publication Data

US 2020/0295467 A1    Sep. 17, 2020

Related U.S. Application Data

(60) Provisional application No. 62/819,418, filed on Mar. 15, 2019.

(51) Int. Cl.
*H01Q 15/00* (2006.01)
*G01S 7/03* (2006.01)
*H01Q 1/52* (2006.01)

(52) U.S. Cl.
CPC ........... *H01Q 15/0086* (2013.01); *G01S 7/03* (2013.01); *H01Q 1/521* (2013.01)

(58) Field of Classification Search
CPC .. H01P 1/2005; H01Q 15/0086; H01Q 1/521; H01Q 17/00; H01Q 17/008; G01S 7/03
See application file for complete search history.

(56) References Cited

U.S. PATENT DOCUMENTS

| | | | | |
|---|---|---|---|---|
| 4,388,388 A * | 6/1983 | Kornbau | ............... | H05K 3/0082 430/323 |
| 5,298,906 A * | 3/1994 | Lantagne | ............... | H01Q 1/525 342/175 |
| 7,215,301 B2 | 5/2007 | Choi et al. | | |
| 7,804,439 B2 * | 9/2010 | Yoshida | ............... | H01Q 17/002 342/4 |
| 9,112,475 B2 | 8/2015 | Sasaki et al. | | |
| 9,323,877 B2 | 4/2016 | Ng et al. | | |
| 9,579,748 B2 | 2/2017 | Nair et al. | | |
| 9,961,812 B2 | 5/2018 | Suorsa | | |
| 2004/0201526 A1 * | 10/2004 | Knowles | ................. | H01Q 3/24 343/700 MS |

(Continued)

OTHER PUBLICATIONS

Nagendra Kushwaha and Raj Kumar, "Study of different shape Electromagnetic Band Gap (EBG) structures for single and dual band applications", Journal of Microwaves, Optoelectronics and Electromagnetic Applications, Jun. 2014, pp. 16-30, vol. 13, India.

*Primary Examiner* — Peter M Bythrow
(74) *Attorney, Agent, or Firm* — Haynes and Boone, LLP

(57) ABSTRACT

Electromagnetic bandgap isolation systems and methods are provided. In one example, an electromagnetic bandgap isolator device includes a base support having a curved surface. The electromagnetic bandgap isolator device further includes a metamaterial. The metamaterial includes a continuous curved layer in contact with the base support. The metamaterial is configured to absorb energy associated with a frequency range. Related systems and methods are also provided.

20 Claims, 10 Drawing Sheets

(56) References Cited

U.S. PATENT DOCUMENTS

| | | | |
|---|---|---|---|
| 2004/0263420 A1* | 12/2004 | Werner | H01Q 1/38 343/909 |
| 2010/0156695 A1* | 6/2010 | Sim | H01Q 17/008 342/1 |
| 2010/0263199 A1 | 10/2010 | Morton et al. | |
| 2012/0141291 A1* | 6/2012 | Appleton | F03D 1/065 416/241 R |
| 2012/0190296 A1 | 7/2012 | Sarabandi et al. | |
| 2015/0214630 A1* | 7/2015 | Shimura | H01Q 1/243 343/909 |
| 2016/0359235 A1* | 12/2016 | Driscoll | G01S 13/42 |
| 2020/0076072 A1* | 3/2020 | Keyrouz | H05K 1/0236 |

\* cited by examiner

ELECTROMAGNETIC BANDGAP ISOLATION SYSTEMS AND METHODS

CROSS REFERENCE TO RELATED APPLICATIONS

This application claims the benefit of and priority to U.S. Provisional Patent Application No. 62/819,418 filed Mar. 15, 2019 and entitled "ELECTROMAGNETIC BANDGAP ISOLATION SYSTEMS AND METHODS," which is incorporated herein by reference in its entirety.

TECHNICAL FIELD

BACKGROUND

Radar systems are commonly used to detect targets (e.g., objects, geographic features, or other types of targets), such as targets in proximity to watercraft, aircraft, vehicles, or fixed locations. The radar systems may transmit (e.g., broadcast) radar signals and receive return signals. Such return signals may be based on reflections of the transmitted radar signals by targets.

SUMMARY

Various electromagnetic bandgap (EBG) structures, radar systems incorporating EBG structures, and methods of manufacturing EBG structures and radar systems incorporating EBG structures are disclosed. For example, in certain embodiments, such a radar system incorporating an EBG structure may be implemented in a cost-efficient manner and with a high degree of functionality.

In one or more embodiments, an electromagnetic bandgap isolator device includes a base support having a curved surface. The electromagnetic bandgap isolator device further includes a metamaterial. The metamaterial includes a continuous curved layer in contact with the base support. The metamaterial is configured to absorb energy associated with a frequency range.

In one or more embodiments, for a method of manufacturing an electromagnetic bandgap isolator device, the method includes providing a metamaterial. The method further includes coupling the metamaterial to a curved surface of a base support such that the metamaterial conforms to the curved surface of the base support.

In one or more embodiments, a radar system includes an electromagnetic bandgap isolator device. The radar system further includes a transmitter configured to emit a signal. The signal includes a first portion and a second portion. The radar system further includes a receiver. The electromagnetic bandgap isolator device is disposed between the transmitter and the receiver. The electromagnetic bandgap isolator device is configured to absorb the second portion of the signal.

In one or more embodiments, for a method of manufacturing a radar system, the method includes providing a transmitter and a receiver. The method further includes disposing the electromagnetic bandgap isolator device between the transmitter and the receiver.

In one or more embodiments, for a method of using an electromagnetic bandgap isolator device, the method includes emitting a signal using a transmitter antenna. The signal includes a first portion and a second portion. The method further includes absorbing, using the electromagnetic bandgap isolator device, the second portion of the signal of the transmitter antenna to prevent coupling of the second portion into a receiver antenna.

In one or more embodiments, a method includes emitting, by a transmitter, a first signal. The first signal includes a first portion and a second portion. The method further includes receiving, by a receiver, a second signal that is based on a reflection of the first portion of the first signal by an object. The method further includes absorbing, by an electromagnetic bandgap isolator device, the second portion of the first signal emitted by the transmitter to prevent coupling of the second portion into the receiver.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
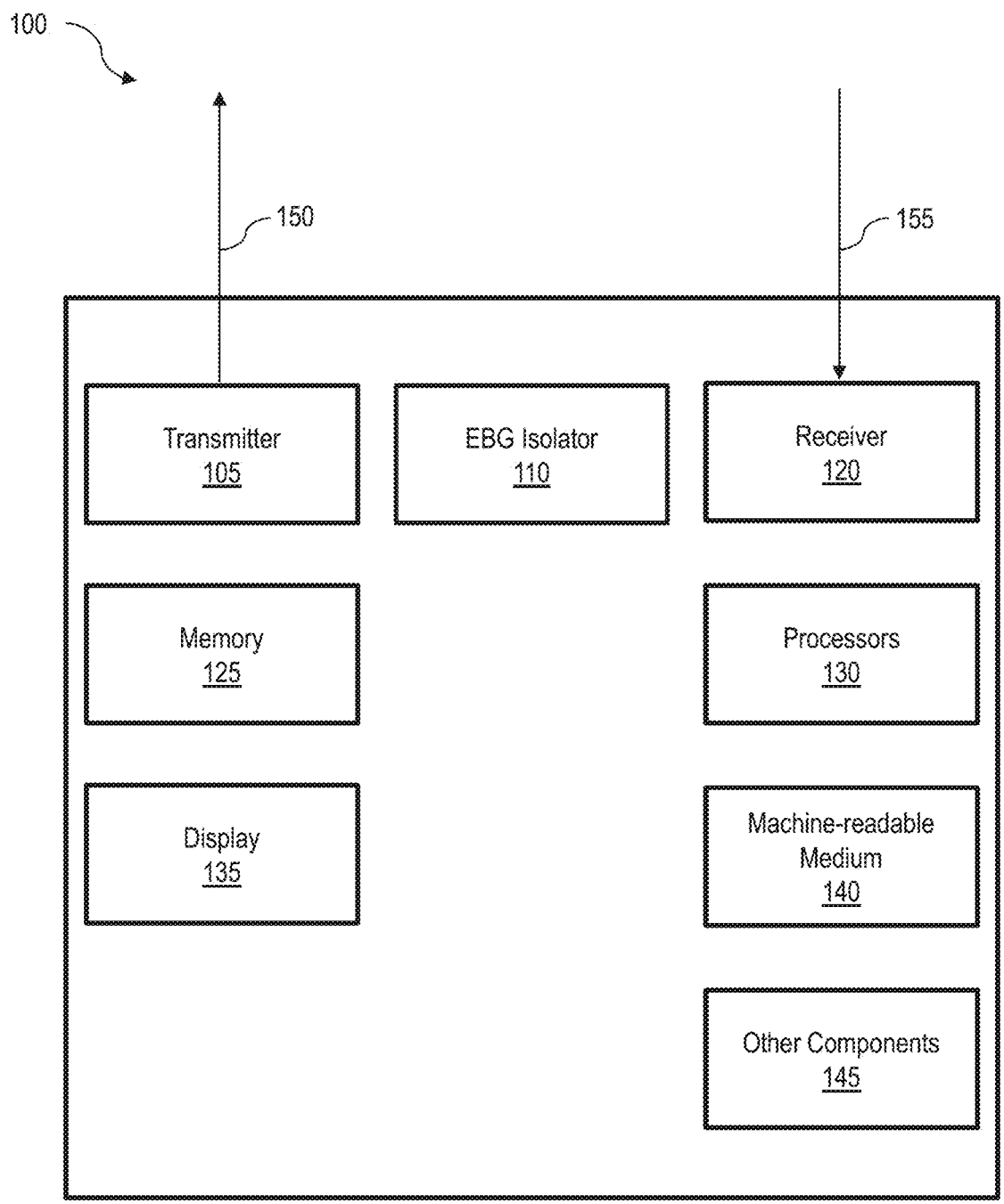
FIG. 1 illustrates a block diagram of an example radar system in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods are disclosed for providing isolation using EBG-based isolator devices (e.g., also referred to simply as EBG isolator devices). In some embodiments, an EBG isolator device may be disposed between transmitter elements and receiver elements to provide isolation between the transmitter elements and the receiver elements, such as in radar applications. For instance, in frequency-modulated continuous-wave (FMCW) radar systems, as well as other radars systems, disposing of such an EBG isolator device may minimize or eliminate an amount of radio frequency (RF) energy emitted by a radar transmitter from coupling into a radar receiver. Prevention (e.g., minimization, elimination, mitigation, attenuation) of such coupling of RF energy into the radar receiver is generally associated with improved radar performance. In some cases, desired performances may be characterized in relation to antenna gain, side lobe characteristics, beam shape, isolation, and/or others.

The EBG isolator device provides an electromagnetic bandgap. In some embodiments, the EBG isolator device includes a layer of material having structures defined thereon, where such structures define the electromagnetic bandgap. The structures may be formed on the material and tailored to meet specifications, such as a desired frequency of stop band. In this regard, for a given EBG isolator device, the electromagnetic bandgap of the EBG isolator device is a frequency range (e.g., or equivalently a wavelength range or an energy range) in which components of an electromagnetic (EM) wave within this frequency range nominally no longer propagates in the EBG isolator device due to the structures of the EBG isolator device. An EM wave (if any) that propagates within the stop band is generally attenuated to a degree such that the EM wave is rendered negligible. Such an attenuated EM wave may be considered as no longer propagating in the EBG isolator device.

In an embodiment, a layer of material and the structures defined thereon together provide a metamaterial. In this regard, a metamaterial may be formed by providing a layer of material and forming, on the layer of material, structures associated with desired electromagnetic bandgap properties in an arrangement over a sufficiently large area or volume of the layer of material. In some aspects, the structures are periodically arranged on the layer of material to cause the metamaterial to exhibit a desired performance. The metamaterial may be created with desired effective dielectric properties and permittivity, such as to achieve a desired electromagnetic bandgap. In one case, a metamaterial may be created such that it matches the free space impedance of an incident wave. For example, the near field electromagnetic distribution of a transmit antenna can be determined (e.g., simulated, measured), and a metamaterial may be created such that a match impedance is seen by the near field on the metamaterial surface. In some cases, iterative design of the transmit antenna and the metamaterial may be performed to obtain desired performances regarding antenna gain, side lobe, beam shape, and isolation, among others.

In some aspects, the structures of the metamaterial may be artificial magnetic conductors (AMCs). AMCs are structures that can be used to create a boundary for an incident EM wave such that a well-controlled phase shift is generated at its interface with air. In this regard, utilization of AMCs facilitates control of a reflected wave amplitude and phase in order to effectuate a desired response. In some embodiments, the metamaterial may include a conductive layer, a substrate layer (e.g., dielectric layer) on the conductive layer, conductive patches on the substrate layer, and vias that extend between and are in contact with the conductive layer and the conductive patches. In these embodiments, each AMC of the metamaterial may include a conductive patch, a portion of the conductive layer, a via between the conductive patch and the portion of the conductive layer, and a portion of the substrate layer. In an aspect, such AMCs may be represented by equivalent LC circuits. The AMCs may be arranged (e.g., periodically arranged or aperiodically arranged) over an area or a volume.

For comparison, relative to an arranged array of AMCs, a continuous sheet/layer of metal creates a 180-degree phase shift relative to an incident EM wave, which may effectively cause a reflected EM wave to be of equal amplitude and opposite phase to the incident EM wave. In a case of a continuous sheet/layer of metal, the addition of the reflected and incident waves would cause destructive interference and, in turn, would cause performance issues for an associated application (e.g., radar application) if there is not proper control. As such, utilization of AMCs provides improved control of a reflected wave amplitude and phase relative to utilizing a continuous sheet/layer of metal.

In an embodiment, the EBG isolator device is provided with a three-dimensional aspect. In some embodiments, to provide the three-dimensional aspect, the EBG isolator device has a non-flat shape. As a non-limiting example, the EBG isolator device may have a circular dome shape to effectuate impedance matching. In other cases, impedance matching may be achieved using other shapes, such as hyperbolic, parabolic, and other non-flat shapes. In one embodiment, the EBG isolator device includes a base support having a curved surface and a metamaterial having a continuous, curved surface in contact with the base support. The continuous, curved surface may be formed of a continuous, curved conductive layer.

In some aspects, the three-dimensional aspect of the EBG isolator device may allow impedance matching of EM waves emitted by a transmitter on the EBG isolator device at angles of incidence of interest (e.g., all possible angles of incidence). In some cases, this three-dimensional aspect of the EBG isolator device may be determined with consideration to the near field EM pattern for a transmitter antenna such that the near field impedance will see a match load coming from the EBG isolator device. In an embodiment, the three-dimensional aspect of the EBG isolator device may allow matching of an incident EM wave angle impinging at 90 degrees to the metamaterial surface of the device. In some cases, such an incident EM wave may be considered or referred to as a parasitic or an undesired EM wave as discussed below. In an aspect, utilizing a metamaterial including AMC structures facilitates matching of the incident EM wave at angles of incidence such as 90 degrees, as AMC structures may be defined for EM waves with a 90-degree angle of incidence. In this regard, the EBG isolator device may effectively act as a match load impedance to surface current and incident EM waves (e.g., to prevent coupling between transmitter antennas and receiver antennas).

Thus, using various embodiments, EBG isolator devices may be provided to prevent coupling of energy between two devices. As an example, in some embodiments, disposing an EBG isolator device between the transmitter and the receiver may minimize or eliminate coupling of parasitic/undesired energy (e.g., originating from the transmitter) into the receiver, which, thereby, improves performance (e.g., radar performance). In some embodiments, to prevent transmitted energy from coupling into the receiver, the EBG isolator device may be utilized to absorb surface current, convert incident electromagnetic waves into surface current to thereby allow the EBG isolator device to absorb the energy, and/or scatter at least a part of the incident EM waves away from the receiver due to an overall shape of the EBG isolator device, such as provided by a curvature and structures (e.g., periodic structures) of the EBG isolator device. Physical characteristics of the EBG isolator device may be determined to effectuate a desired response (e.g., frequency response) to incident electromagnetic waves. By way of non-limiting example, physical characteristics may include a three-dimensional aspect (e.g., curvature) of the metamaterial and the associated base support, material composition of the layer of material, structures formed on the layer of material, and/or others.

In a radar application, the receiver may be intended to receive reflected EM waves originating from a main lobe of a transmitter antenna. In an embodiment, the transmitter antenna may transmit EM waves in its main lobe, an object in a scene may reflect these EM waves, and the receiver may be intended to receive the reflected EM waves. In relation to the transmitter antenna's radiation pattern, in addition to the main lobe, the transmitter antenna may emit energy (e.g., EM waves/radiation) in one or more side lobe signals. In some cases, the receiver may also be intended to receive reflected EM waves originating from the side lobe(s) of the transmitter antenna. In an aspect, the transmitter antenna may transmit EM waves in its side lobe(s), an object in the scene may reflect these EM waves, and the receiver may be intended to receive the reflected EM waves. In some cases, other signals may be considered, to the receiver, parasitic/undesired signals (e.g., energy). Parasitic/undesired energy received by the receiver may include energy emitted by the transmitter antenna in the side lobe(s). For example, the transmitter antenna side lobe(s) may transmit EM waves that are not reflected by an object in a scene, but instead are incidentally directed toward the receiver (e.g., through coupling of the transmit EM waves emitted by the transmitter antenna straight to the receiver antenna via a line of sight between the transmitter antenna and the receiver antenna). Such EM waves may be considered parasitic/undesired signals.

As such, a signal (e.g., EM waves/radiation) emitted by the transmitter antenna may include a main lobe signal and one or more side lobe signals. In one embodiment, the main lobe signal may be considered a first portion (e.g., also referred to as a first component) of the signal emitted by the transmitter antenna. In an aspect, the first portion of the signal may also include one or more side lobe signal(s). One or more of its side lobe signals may be considered a second portion (e.g., also referred to as a second component) of the signal emitted by the transmitter antenna. As an example, the main lobe signal and one or more side lobe signals may be considered a first portion of the signal while additional side lobe signals (e.g., those that directly couple from the transmitter antenna to the receiver antenna) may be considered a second portion of the signal. The second portion may be considered an undesired/parasitic signal of the receiver antenna. It is noted that the designation of a portion of a signal as being a first portion or a second portion is arbitrary and utilized for convenience to identify different portions of the signal.

Referring now to the drawings, FIG. 1 illustrates a block diagram of a radar system 100 in accordance with one or more embodiments of the present disclosure. Variations in the arrangement and type of the components may be made without departing from the spirit or scope of the claims as set forth herein. Additional components, different components, and/or fewer components may be provided. In various embodiments, the radar system 100 may be configured for use on watercraft, aircraft, vehicles, fixed locations, or other environments, and may be used for various applications such as, for example, leisure navigation, commercial navigation, military navigation, other types of navigation, or other applications. In one aspect, the radar system 100 may be implemented as a relatively compact portable unit that may be conveniently installed by a user.

The radar system 100 includes a transmitter circuitry 105, an EBG isolator 110, a receiver circuitry 120, a memory 125, processors 130, a display 135, a machine-readable medium 140, and other components 145. The transmitter circuitry 105 includes one or more transmit (TX) antenna elements and appropriate circuitry to generate radar signals and provide such radar signals to the TX antenna elements, such that these radar signals can be transmitted by the TX antenna elements. Such transmitted radar signals are denoted as signals 150 of FIG. 1. The transmitter circuitry 105 may include a waveform generator that generates various waveforms to be utilized as radar signals. Such waveforms may include pulses of various lengths (e.g., different pulse widths), FMCW signals, and/or other waveforms appropriate for radar applications. FMCW signals may be implemented, for example, as rising, falling, or rising/falling frequency sweeps (e.g., upchirps, downchirps, or up/down chirps). In some cases, the waveforms may be beamformed waveforms. The transmitter circuitry 105 may include one or more power amplifiers that receive the radar signals from the waveform generator and drive the radar signals on the TX antenna element(s) of the transmitter circuitry 105. In some cases, characteristics of the radar signals may be based at least in part from control signals received by the processors 130.

The receiver circuitry 120 may include one or more receive (RX) antenna elements (e.g., phased array antennas) and circuitry to process radar signals received by the RX antenna elements. Such received radar signals are denoted as signals 155 of FIG. 1. The RX antenna elements can receive radar signals 155, which may be reflections of the transmitted radar signals 150 from targets/objects. These received radar signals 155 may be referred to as return signals. The receiver circuitry 120 may include appropriate circuitry to process these return signals. The receiver circuitry 120 may include one or more low-noise amplifiers (LNAs) for amplifying the received radar signals 155. The receiver circuitry 120 may include a demodulator to receive the radar signals 155 and convert the received radar signals 155 to baseband. In some cases, the demodulator may generate I signals and Q signals based on the received radar signals 155. The circuitry may include filters (e.g., low-pass filters) to be applied to the radar signals (e.g., baseband radar signals). The receiver circuitry 120 may include an analog-to-digital (ADC) circuit to convert the received radar signals 155, or filtered versions thereof, which are analog signals, to digital radar signals. The digital radar signals may be provided to the processors 130 for further processing to facilitate radar applications (e.g., target detection applications).

The EBG isolator 110 is disposed between the transmitter circuitry 105 and the receiver circuitry 120 of the radar system 100. The EBG isolator 110 may be utilized to prevent an amount of radio frequency (RF) energy (e.g., bandlimited RF energy) emitted by the transmitter circuitry 105 (e.g., the TX antenna element(s)) from coupling into the receiver circuitry 120 (e.g., the RX antenna element(s)). For instance, the RF energy may be associated with the signals 150. Radar performance is generally improved by minimizing the RF energy from the transmitter circuitry 105 that may couple into the receiver circuitry 120 of the EBG isolator 110. Desired performances may be characterized in relation to antenna gain, side lobe characteristics, beam shape, isolation, and/or others. As further discussed below with regard to the additional figures, the EBG isolator 110 prevents an amount of transmitted RF energy from coupling to the receiver circuitry 120 by absorbing surface current, converting incident EM waves into surface current such that the EBG isolator 110 may absorb the RF energy, and/or scattering at least a part of the incident EM waves away from the receiver circuitry 120 (e.g., away from the RX antenna element(s)) due to an overall shape of the EBG isolator 110.

In an embodiment, the EBG isolator 110 may effectively provide a match load impedance to both the surface current and incident EM wave associated with RF energy emitted by the transmitter circuitry 105. In this regard, TX to RX coupling may be prevented (e.g., eliminated, reduced, mitigated, attenuated) relative to a case in which the EBG isolator 110 is not disposed between the transmitter circuitry 105 and the receiver circuitry 120. Improved isolation (e.g., increased isolation) is generally associated with a higher radar range and higher accuracy. In an aspect, a three-dimensional aspect of the EBG isolator 110, further discussed below with regard to FIGS. 2 and 3, permits impedance matching at all angles of incidence of transmitter circuitry's 105 emitted EM waves upon the EBG isolator 110. In some cases, the three-dimensional shape of the EBG isolator 110 may be optimized according to a near field EM wave pattern of the transmitter circuitry 105 (e.g., the TX antenna elements) such that a near field impedance associated with these EM waves sees a matching load coming from the EBG isolator 110. In an embodiment, the EBG isolator 110 has a non-flat shape. As a non-limiting example, the EBG isolator 110 may have a circular dome shape to effectuate impedance matching. In some cases, impedance matching may be achieved using other shapes, such as hyperbolic, parabolic, and other non-flat shapes.

The processors 130 may be implemented as any appropriate processing device (e.g., microcontroller, processor, application specific integrated circuit (ASIC), logic device, field-programmable gate array (FPGA), circuit, or other device) that may be used by the radar system 100 to execute appropriate instructions, such as non-transitory machine readable instructions (e.g., software) stored on the machine-readable medium 140 and loaded into the memory 125. For example, on an RX side, the processors 130 may be configured to receive and process radar data received by the receiver circuitry 120, store the radar data, processed radar data, and/or other data associated with the radar data in the memory 125, and provide the radar data, processed radar data, and/or other data associated with the radar data for processing, storage, and/or display. In this example, outputs of the processors 130 may be, or may be derived into, representations of processed radar data that can be displayed by the display 135 for presentation to one or more users. On a TX side, the processors 130 may generate radar signals or associated signals to cause radar signals to be generated and fed to the transmitter circuitry 105, such that these radar signals can be transmitted by the TX antenna element(s) of the transmitter circuitry 105

The memory 125 includes, in one embodiment, one or more memory devices configured to store data and information, including radar data. The memory 125 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processors 130 may be configured to execute software instructions stored in the memory 125 so as to perform method and process steps and/or operations. The processors 130 may be configured to store in the memory 125 data such as, by way of non-limiting example, filter coefficients, beamforming coefficients, and object/target detection data.

The display 135 may be used to present radar data, images, or information received or processed by the radar system 100. In one embodiment, the display 135 may be a multifunction display with a touchscreen configured to receive user inputs to control the radar system 100.

The radar system 100 may include various other components 145 that may be used to implement other features such as, for example, sensors, actuators, communications modules/nodes, other user controls, communication with other devices, additional and/or other user interface devices, and/or other components. In some embodiments, other components 145 may include a humidity sensor, a wind and/or water temperature sensor, a barometer, a visible spectrum camera, an infrared camera, and/or other sensors providing measurements and/or other sensor signals that can be displayed to a user and/or used by other devices of radar system 100 to provide operational control of the radar system 100. For example, such sensor signals may be utilized to compensate for environmental conditions, such as wind speed and/or direction; swell speed, amplitude, and/or direction; and/or an object in a path (e.g., line of sight) of the radar system 100. Imagers (e.g., visible spectrum camera, infrared camera) may be utilized to provide situational awareness of a scene, such as by providing image data associated with captured radar data. In some cases, sensor information can be used to correct for movement (e.g., changes in position and/or speed) associated with the radar system 100 between beam emissions to provide improved alignment of corresponding radar returns/samples, for example, and/or to generate imagery based on the measured orientations and/or positions of the radar system 100 assembly/antennas. In some cases, an external orientation and/or position sensor can be used alone or in combination with an integrated sensor or sensors. In some cases, alternatively or in addition to having sensors and/or other devices as part of the radar system 100, the sensors and/or other devices may be collocated with the radar system 100. Such sensors and/or other devices may provide data to the radar system 100 (e.g., via wired and/or wireless communication).

In some cases, the radar system 100 may include one or more visible spectrum cameras and/or one or more infrared cameras, such as to capture image data of a scene scanned by the radar system 100. In one embodiment, the other components 145 includes a communication interface that may communicate with another device that may be implemented with some or all of the features of the radar system 100. Such communication may be performed through appropriate wired or wireless signals (e.g., Wi-Fi™, Bluetooth™, or other standardized or proprietary wireless communication techniques). In one example, the radar system 100 may be located at a first position (e.g., on a bridge of a watercraft in one embodiment) and may communicate with a personal electronic device (e.g., a cell phone in one embodiment) located at a second position (e.g., co-located with a user on another location on the watercraft). In this regard, the user's personal electronic device may receive radar data and/or other information from the radar system 100. As a result, a user may conveniently receive relevant information (e.g., radar images, alerts, or other information) even while not in proximity to the radar system 100.

Figure 2:
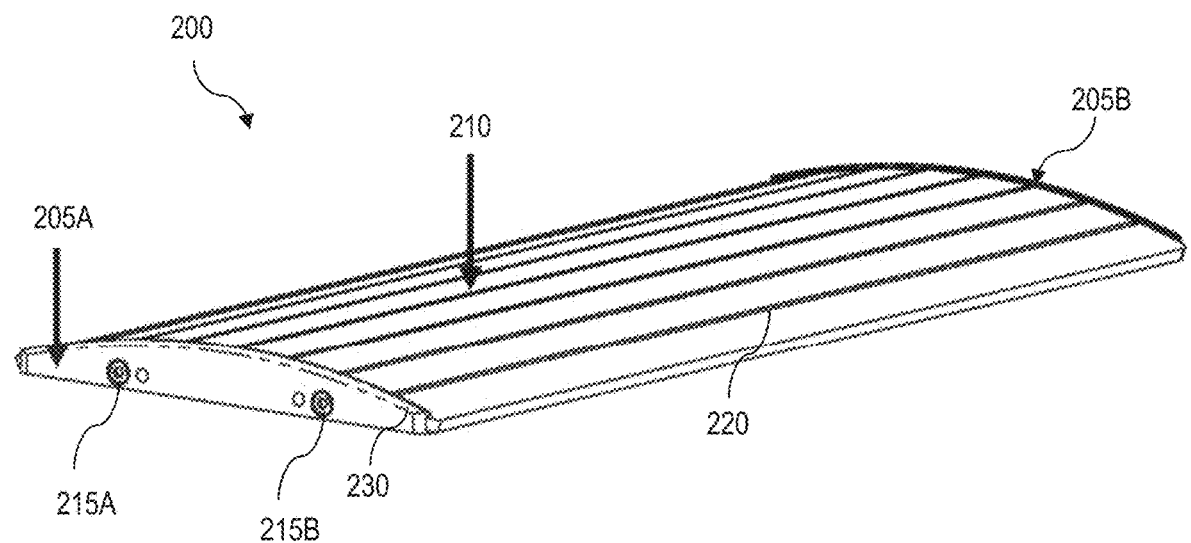
FIG. 2 illustrates an example electromagnetic bandgap isolator device in accordance with one or more embodiments of the present disclosure.
Figure 3:
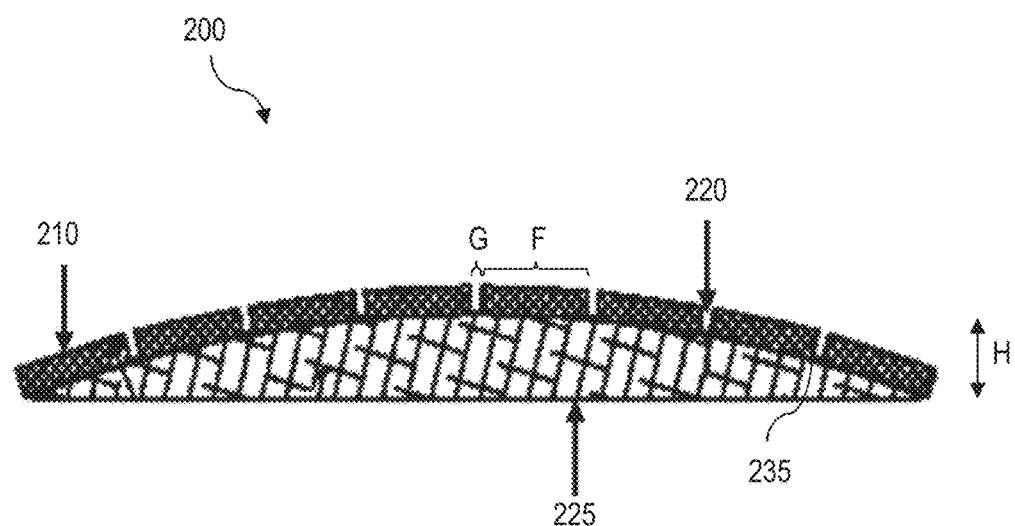
FIG. 3 illustrates a top sectional view of an example electromagnetic bandgap isolator device in accordance with one or more embodiments of the present disclosure.

FIGS. 2 and 3 illustrate a perspective view and a side view, respectively, of an example EBG isolator 200 in accordance with one or more embodiments of the present disclosure. Not all of the depicted components may be required, however, and one or more embodiments may include additional components shown in the figures. Variations in the arrangement and type of the components may be made without departing from the spirit or scope of the claims as set forth herein. Additional components, different components, and/or fewer components may be provided.

As shown in FIGS. 2 and 3, the EBG isolator 200 includes end supports 205A and 205B, a metamaterial 210, engagement elements 215A and 215B, grooves (e.g., a groove 220), and a base support 225. To allow coupling between the end support 205A and the base support 225, engagement elements 215A and 215B may be provided through the end support 205A and into a receiving interface of the base support 225. Although the engagement elements 215A and 215B are shown as screws, other types of engagement elements such as adhesives, bumps and ridges, and/or generally any fastener are contemplated. The end support 205A may include a lip 230 (e.g., edge, cap, lid, or other restraining interface) to assist in maintaining the metamaterial 210 in a fixed position. Not shown in FIGS. 2 and 3 are engagement elements provided through the end support 205B and into a receiving interface of the base support 225 at an opposing side from the end support 205A. In an aspect, the end supports 205A and 205B and the base support 225 provides a supporting structure for fixedly holding the metamaterial 210. The end supports 205A and 205B may be made of any material suitable for a desired application. For example, the end supports 205A and 205B may be made of any metal, metal alloy, plastic, a combination thereof, and/or other material appropriate for a desired application. In one case, the end supports 205A and 205B may be made of aluminum.

The metamaterial 210 includes multiple, periodic instances of unit cells. The metamaterial 210 provides a mesoscopic physical system, in which a behavior of the metamaterial 210 is a result of behavior at the unit cell level. Characteristics of the unit cells (e.g., sizes and shapes that define the unit cells, distance between adjacent unit cells, etc.) may be designed to yield prescribed electromagnetic properties. In an aspect, each unit cell may include one or more AMC structures. An example of a metamaterial and its unit cells are described below with respect to FIGS. 4 and 5.

The base support 225 has a curved surface on which the metamaterial 210 may attach to conform to the curvature of the base support 225. For example, the metamaterial 210 may be glued or otherwise coupled to the base support 225. In this regard, a three-dimensional aspect of the EBG isolator 200 is provided by bending the metamaterial 210 over the curvature of the base support 225. The base support 225 may be made of any material suitable for a desired application. For example, the base support 225 may be made of any metal, metal alloy, plastic, a combination thereof, and/or other material appropriate for a desired application. In one case, the base support 225 may be made of aluminum. A distance from a bottom surface of the base support 225 to an apex of the base support 225 is denoted as H in FIG. 3. In one embodiment, in designing the base support 225 for a radar application, the distance H and other dimensions of the base support 225 may be appropriate for radiation patterns of a transmitter and a receiver, and to limit electromagnetic interference due to the EBG isolator 200 while preventing undesired signals emitted by the transmitter from coupling into the receiver.

The grooves, of which the groove 220 is labeled in FIGS. 2 and 3, are disposed along a length of the metamaterial 210 to facilitate bending of the metamaterial 210 to conform to the curvature of the base support 225. In one embodiment, the grooves are disposed along a length of the metamaterial 210 such that the grooves are perpendicular or substantially perpendicular to a line(s) of sight between a transmitter antenna and a receiver antenna for a radar system (e.g., the radar system 100 of FIG. 1). In some cases, the disposition of the grooves in the metamaterial 210 between the transmitter antenna and receiver antenna may effectively attenuate/prevent coupling of parasitic/undesired signals (e.g., EM waves) radiating from the transmitter antenna from reaching the receiver antenna. As shown in FIGS. 2 and 3, the grooves divide the metamaterial 210 into a plurality of portions (e.g., strips, panels) having a shared ground plane 235. In one example, a distance between adjacent portions of the metamaterial 210 (one such distance is denoted as G in FIG. 3) may be approximately 1 mm. The distance G may be referred to as a groove width, a gap width, or a spacing. In one example, a width of each of the plurality of portions (one such width of a portion is denoted as F in FIG. 3) may be approximately 14 mm. To maintain continuity of the ground plane 235 for the metamaterial 210, the groove depth is less than a thickness of the metamaterial 210. In one example, the thickness of the metamaterial is around 3.25 mm, such that the groove depth is less than 3.25 mm in order to maintain continuity of the ground plane 235. The continuity of the ground plane 235 provides a continuous portion/layer of the metamaterial 210 that is in contact with the base support 225. The ground plane 235 is continuous to maintain the surface currents inside the metamaterial 210 and maintain periodicity of the metamaterial 210, thus defining and facilitating effective operation of a band gap of the metamaterial 210. The ground plane 235 may be made of conductive material suitable for an intended application. For example, the ground plane 235 may be made of copper, and may be plated with silver, gold, nickel, or other metals. Distances and dimensions discussed herein may be variable to suit an intended application. In some cases, energy absorbed by EBG isolator 200 may be appropriately grounded by way of one or more of the end supports 205A-B, the base support 225, and/or the ground plane 235.

A surface of the EBG isolator 200 opposite of the curved surface may be flat to facilitate attaching the EBG isolator 200 to a radar surface of a radar system (e.g., the radar system 100). The flat surface of the EBG isolator 200 may be attached to the radar surface in between transmit circuitry (e.g., TX antenna element(s)) and receive circuitry (e.g., RX antenna element(s)). In an aspect, the surface opposite of the curved surface may have grooves, notches, latches, and/or other features to facilitate attachment of the EBG isolator 200 to a radar system.

In various embodiments, as shown in FIGS. 2 and 3, to provide improved isolation performance (e.g., relative to a case in which the EBG isolator 200 is not disposed), the metamaterial 210 is provided on and as a curved surface (e.g., non-flat surface) and with the ground plane 235 that is continuous. In some cases, a monotonicity of the curved surface of the metamaterial 210 allows matching of an incident wave impedance with a near field of transmitter circuitry (e.g., near field of TX antenna element(s)). The monotonicity of the curved surface of the metamaterial 210 is provided by the curved surface monotonically sloping downwards away from an apex of the base support 225. Various dimensions and distances associated with the EBG isolator 200 are provided as appropriate to facilitate conformity to the base support 225 in order to provide a substantially continuous surface for incident EM waves and monotonicity of the EBG isolator 200. In FIGS. 2 and 3, the semi-cylindrical structure of the metamaterial 210 may utilize a knife-edge effect toward incident EM waves from a TX antenna element(s) and, thereby, prevent radiating EM waves from reaching RX antenna element(s). Although the foregoing describes an embodiment in which a metamaterial has grooves disposed therein, in other embodiments, a metamaterial does not have grooves disposed therein. For example, a metamaterial may be formed of one or more materials that can conform (e.g., be bent, have appropriate flexibility, etc.) to a curvature of a base support without the grooves to facilitate the conformity. Dependent on a material system of a metamaterial, fewer, more, or no grooves may be disposed on the metamaterial. In one case, a metamaterial may have a substrate (e.g., formed of plastic material) that can be thermally formed to a desired shape, such as a curved shape that conforms to an associated base support. In this case, fewer or no grooves may be needed to conform the substrate to the base support.

Figure 4:
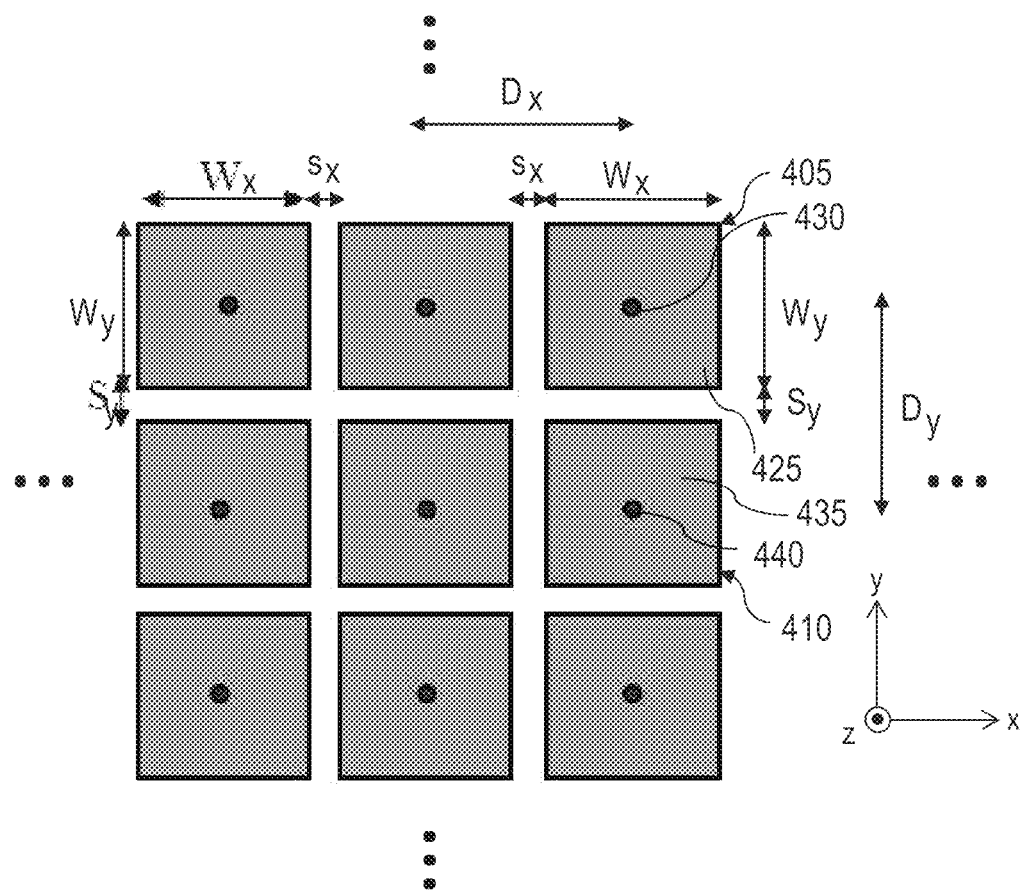
FIG. 4 illustrates a magnified view of the metamaterial of the electromagnetic bandgap isolator device in accordance with one or more embodiments of the present disclosure.
Figure 5:
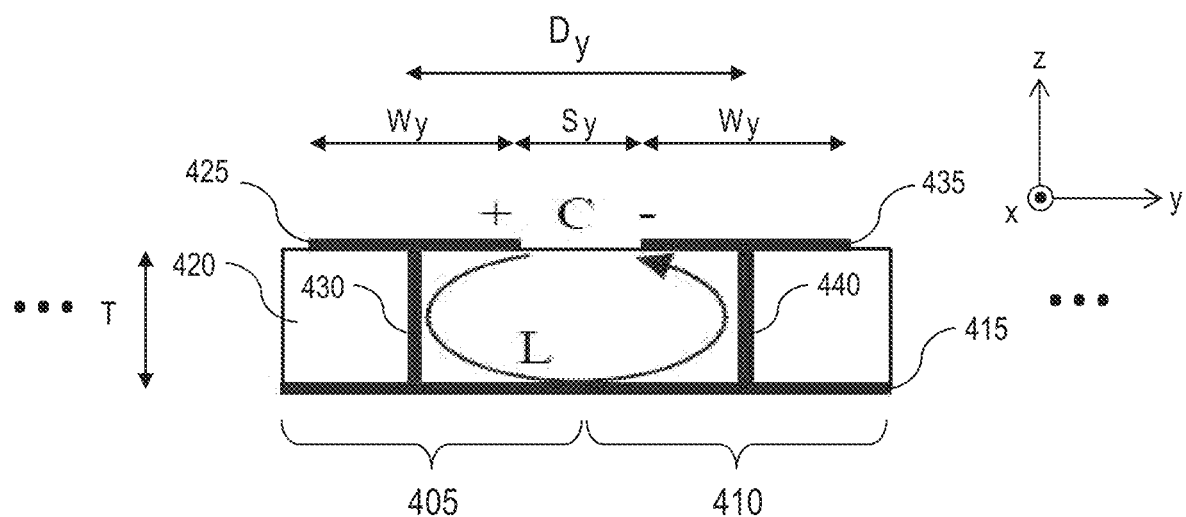
FIG. 5 illustrates an example equivalent circuit of the metamaterial of FIG. 4 in accordance with one or more embodiments of the present disclosure.

FIGS. 4 and 5 illustrate a top view and a side view, respectively, of a respective portion of an example metamaterial in accordance with one or more embodiments of the present disclosure. The metamaterial includes unit cells, of which, unit cells 405 and 410 are labeled in FIGS. 4 and 5. In an embodiment, the metamaterial 210 may be implemented using the metamaterial shown in FIGS. 4 and 5.

A top view of a conductive path and a via of nine unit cells are shown in FIG. 4. In FIG. 4, the ellipses to the left, right, above, and below the unit cells (e.g., the unit cells 405 and 410) indicate that one or more additional unit cells or no unit cells are provided to the left, right, above, or below, respectively, the unit cells. Similarly, in FIG. 5, the ellipses to the left and right, respectively, of the unit cells 405 and 410 indicate that one or more additional unit cells or no unit cells are provided to the left and the right of the unit cells 405 and 410.

As shown in FIGS. 4 and 5, each unit cell includes a conductive patch, a portion of a conductive layer 415, a portion of a substrate layer 420, and a via between the conductive patch and the portion of the conductive layer 415. In an aspect, such a unit cell may be referred to as an AMC. In this regard, the conductive layer 415 provides a continuous conductive layer shared by the unit cells of the metamaterial. The conductive layer 415 may be referred to as a ground plane common to the unit cells of the metamaterial. For example, the unit cell 405 includes a conductive patch 425, a via 430, and a portion of the conductive layer 415. The unit cell 410 includes a conductive patch 435, a via 440, and a portion of the conductive layer 415. In an aspect, each unit cell may be referred to as providing one mushroom structure of the metamaterial.

The vias (e.g., the vias 430 and 440) extend through a thickness T along a z-direction of the substrate layer 420. In this regard, a height of the via is provided by the thickness T of the substrate layer 420. In one aspect, the vias are plated with metal (e.g., copper plated) and filled with epoxy. The substrate layer 420 is a layer of dielectric material. The substrate layer 420 may be a layer of FR4 material, Rogers Corporation® RO4350B™, Arlon DiClad880, and/or other dielectric material as appropriate for an intended application. In one example, the thickness T is approximately 3.25 mm. The vias may have a diameter of approximately 0.5 mm. A space $S_x$ and a space $S_y$ (e.g., also referred to as a gap) denote a distance along an x-direction and a y-direction, respectively, between adjacent conductive patches of the unit cells. A width $W_x$ and a width $W_y$ denotes a width along an x-direction and a y-direction, respectively, of each unit cell. Each patch has a dimension $W_x \times W_y$. A distance $D_x$ and $D_y$ (e.g., referred to as a pitch, a center-to-center distance, an on-center spacing, or a heart distance) denotes a distance along an x-direction and a y-direction, respectively, between adjacent vias. In FIGS. 4 and 5, each unit cell is associated with a square-shape (e.g., a square-shaped mushroom structure) in which $W_x=W_y$, $S_x=S_y$, and $D_x=D_y$. As an example, each conductive plate may be a square of dimensions 1 mm×1 mm (e.g., $W_x=W_y=1$ mm). The spacing $S_x=S_y$ may be approximately 0.25 mm. The distance $D_x=D_y$ may be approximately 1.25 mm. Other embodiments may utilize unit cells having a patch of a rectangular shape (e.g., $W_x \neq W_y$, and/or $S_x \neq S_y$) or other shape (e.g., triangular, hexagonal, pentagonal, circular, elliptical, etc.) dependent on application (e.g., desired characteristics, manufacturing costs, etc.). The conductive layer 415, conductive patches, and vias may be made of any conductive material suitable for an intended application. For example, the conductive layer 415, conductive patches, and vias may be made of copper, and may be plated with silver, gold, nickel, or other metals.

A transmission response of the metamaterial depends upon the size of the conductive patches (e.g., mushroom patches) of the unit cells, diameter of the vias of the unit cells, and the gap between the unit cells. FIG. 5 illustrates an equivalent circuit model for the unit cells 405 and 410 of the metamaterial. The metamaterial may be represented or characterized by equivalent LC circuits having a capacitance C and an inductance L. A frequency response, including a resonant frequency, associated with the metamaterial may be determined based on the capacitance C and the inductance L. The resonant frequency is a central frequency of the band gap provided by the metamaterial. In this regard, a resonance associated with the metamaterial defines a frequency range of a stop band of the metamaterial, where the stop band provides a frequency range over which surface impedance is high to block flow of surface current. As such, the unit cells act as frequency-selective electric filters to block surface current flowing across the metamaterial. The unit cells (e.g., 405, 410) may have structural characteristics designed to facilitate applications (e.g., radar applications) in a desired frequency range/band, such as the X-band (e.g., approximately between 8 GHz and 12.0 GHz), other microwave frequencies, or other frequencies based on a desired application. Structural characteristics of the unit cells include a pitch between unit cells, size of conductive patch of each unit cell, and so forth.

With reference to the unit cells 405 and 410, the capacitance C of the equivalent circuit is determined based on the spacing (e.g., $S_x$, $S_y$) between adjacent conductive patches of the unit cells 405 and 410 and the patch width (e.g., $W_x$, $W_y$) of the unit cells. The inductance L of the equivalent circuit is based on dimensions of the vias 430 and 440 (e.g., via height and diameter) and an effective electrical length (e.g., a length of a conductive path) between the vias 430 and 440. More generally, each adjacent pair of unit cells of the metamaterial have an equivalent LC circuit. The capacitance C is determined based on the spacing (e.g., $S_x$, $S_y$) between adjacent conductive patches of the unit cells and the patch width (e.g., $W_x$, $W_y$) of the unit cells. The inductance L of the equivalent circuit is based on via height and diameter and an effective electrical length between unit cells.

It is noted that FIGS. 2-5 illustrate non-limiting examples of metamaterials. For instance, in a different implementation of a metamaterial, the vias of each unit cell may be positioned off-center of the conductive patches. Other metamaterials having a different curvature and/or different structures (e.g., AMC structures) than those shown in FIGS. 2-5 may be utilized as appropriate, such as to realize a desired response (e.g., frequency response).

Figure 6:
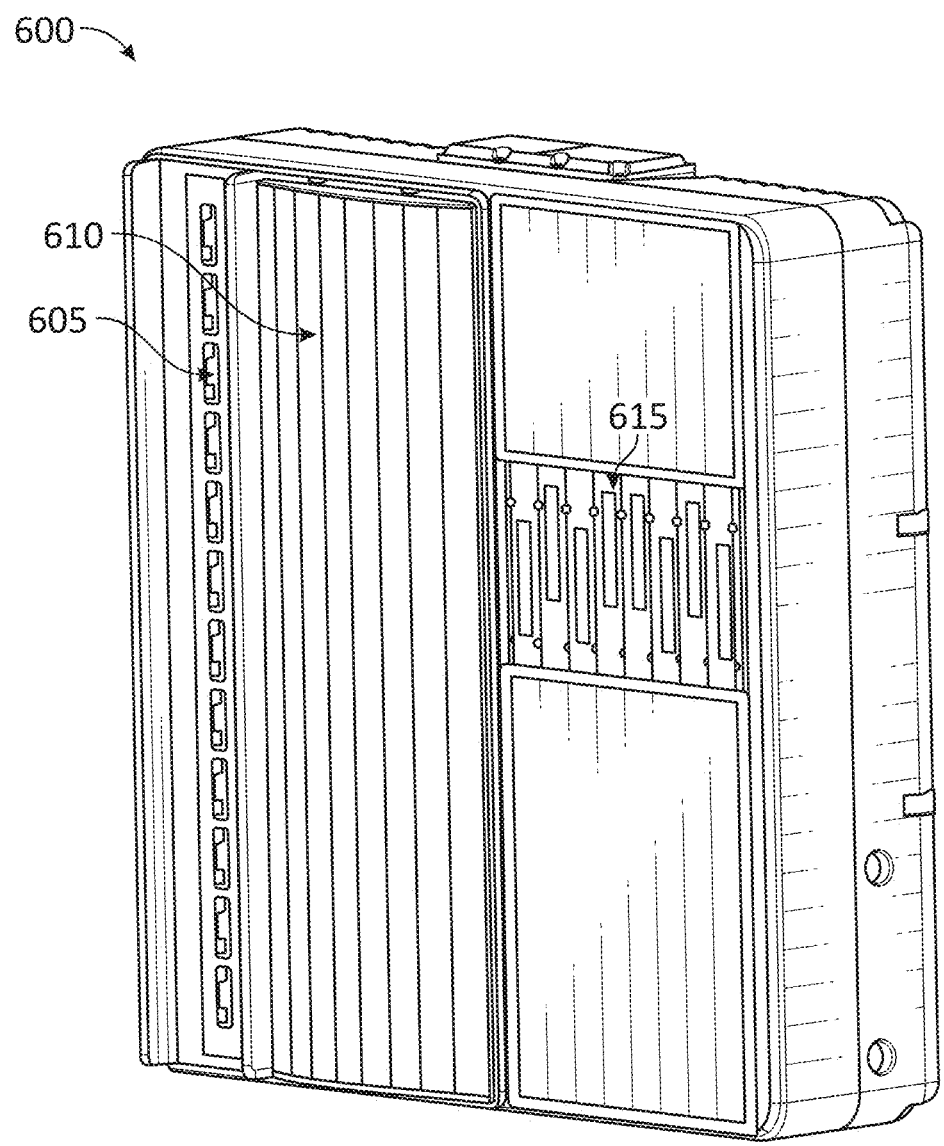
FIG. 6 illustrates an example radar system including an electromagnetic bandgap isolator device in accordance with one or more embodiments of the present disclosure.

FIG. 6 illustrates a radar system 600 in accordance with one or more embodiments of the present disclosure. In some embodiments, the radar system 600 may be, may include, or may be a part of the radar system 100 FIG. 1. Not all of the depicted components may be required, however, and one or more embodiments may include additional components shown in the figures. Variations in the arrangement and type of the components may be made without departing from the spirit or scope of the claims as set forth herein. Additional components, different components, and/or fewer components may be provided.

As shown in FIG. 6, the radar system 600 includes an EBG isolator 610, a TX antenna 605, and a RX antenna 615. In some embodiments, the EBG isolator 610 may be, may include, or may be a part of the EBG isolator 110 or 200 of FIG. 1 or FIGS. 2 and 3, respectively. In some embodiments, the TX antenna 605 may be, may include, or may be a part of the transmitter circuitry 105 of FIG. 1. In some embodiments, the RX antenna 615 may be, may include, or may be a part of the receiver circuitry 120 of FIG. 1. In an aspect, the RX antenna 615 may be a phased-array antenna. The EBG isolator 610 is disposed between the TX antenna 605 and the RX antenna 615 to provide isolation (e.g., prevent coupling) between the TX antenna 605 and the RX antenna 615. In this regard, the EBG isolator 610 prevents signals transmitted by the TX antenna 605 from coupling into the RX antenna 615.

Figure 7:
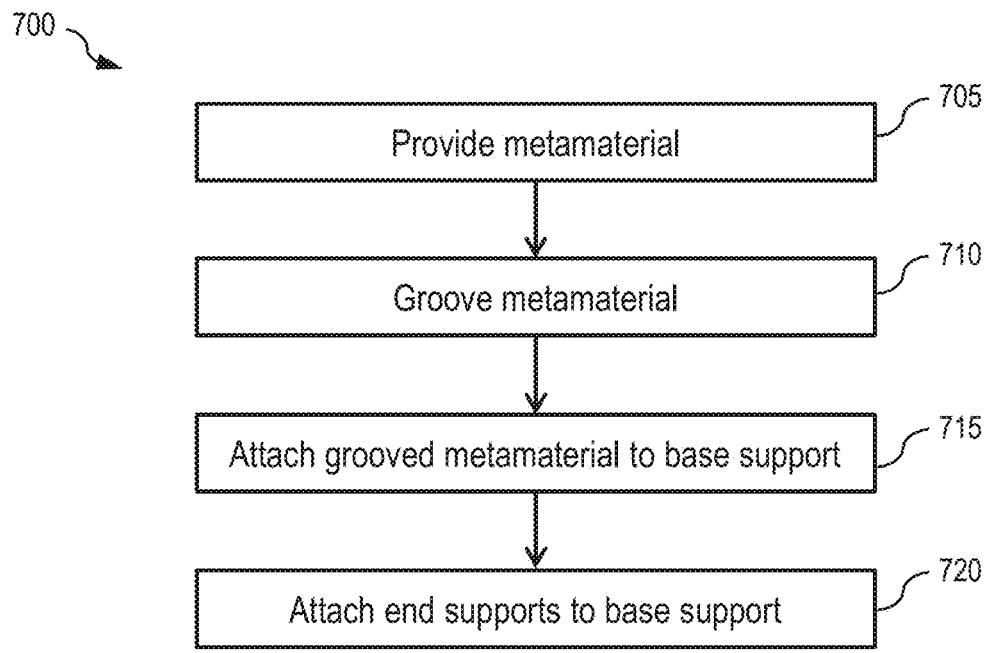
FIG. 7 illustrates a flow diagram of an example process for assembling an electromagnetic bandgap device in accordance with one or more embodiments of the present disclosure.

FIG. 7 illustrates a flow diagram of an example of a process 700 for manufacturing an EBG isolator in accordance with one or more embodiments of the present disclosure. For explanatory purposes, the process 700 is described herein with reference to various components of one or more of FIGS. 2 and 3; however, the process 700 is not limited to various components of FIGS. 2 and 3. Note that one or more operations may be combined, omitted, and/or performed in a different order as desired.

At block 705, a metamaterial having unit cells is provided. At block 710, grooves are added to the provided metamaterial to obtain the metamaterial 210. For example, the provided metamaterial may be grooved (e.g., cut) such that the provided metamaterial is separated into portions that share the continuous ground plane 235, as shown by the metamaterial 210 in FIGS. 2 and 3. The metamaterial 210 may be referred to as a grooved metamaterial. At block 715, the metamaterial 210 is attached to the base support 225. In an aspect, the metamaterial 210 may be attached to a curved surface of the base support 225. Attachment may be performed using one or more engagement elements, such as adhesives, screws, and/or generally any fastener. The grooves (e.g., 220) of the metamaterial 210 may facilitate bending of the metamaterial 210 such that the metamaterial 210 conforms to the curved surface of the base support 225. In this regard, by bending the metamaterial 210, the ground plane 235 provides a continuous, curved conductive layer that is attached to the curved surface of the base support 225. At block 720, the end supports 205A and 205B are attached to the base support 225. Attachment may be performed using one or more engagement elements, such as adhesives, screws, and/or generally any fastener. Lips (e.g., 230) of the end supports 205A and 205B may assist in maintaining the metamaterial 210 in a fixed position.

Figure 8:
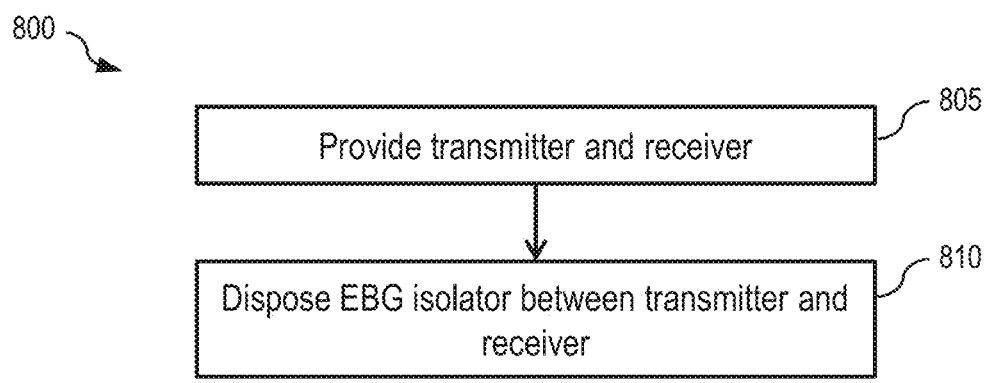
FIG. 8 illustrates a flow diagram of an example process for assembling a radar system including an electromagnetic bandgap isolator device in accordance with one or more embodiments of the present disclosure.

FIG. 8 illustrates a flow diagram of an example of a process 800 for assembling an EBG isolator in a radar system in accordance with one or more embodiments of the present disclosure. For explanatory purposes, the process 800 is described herein with reference to various components of one or more of FIG. 1; however, the process 800 is not limited to various components of FIG. 1. Note that one or more operations may be combined, omitted, and/or performed in a different order as desired.

At block 805, a radar system is provided. In some cases, the radar system may be the radar system 100 (without the EBG isolator 110) of FIG. 1. At block 810, the EBG isolator 110 is disposed (e.g., positioned, placed, attached) between a transmitter antenna and a receiver antenna of the radar system. The transmitter antenna may be, may include, or may be a part of the transmitter circuitry 105 of FIG. 1. The receiver antenna may be, may include, or may be a part of the receiver circuitry 120 of FIG. 1.

Figure 9:
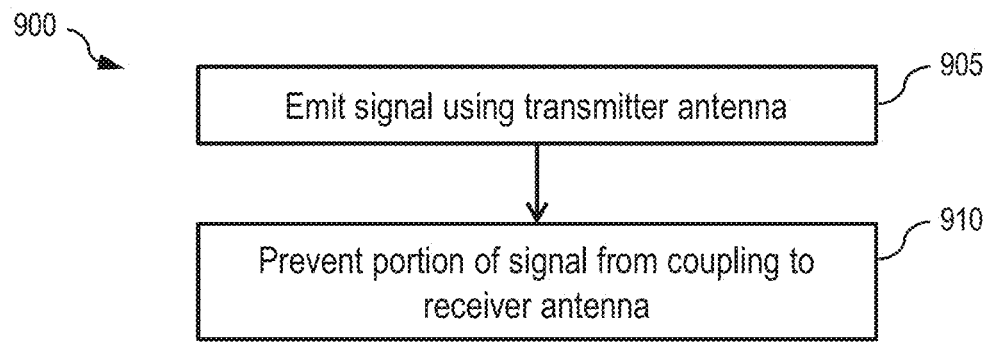
FIG. 9 illustrates a flow diagram of an example of a process for using an electromagnetic bandgap isolator device in accordance with one or more embodiments of the present disclosure.

FIG. 9 illustrates a flow diagram of an example of a process 900 for using an EBG isolator in accordance with one or more embodiments of the present disclosure. For explanatory purposes, the process 900 is described herein with reference to various components of one or more of FIG. 1; however, the process 900 is not limited to various components of FIG. 1. Note that one or more operations may be combined, omitted, and/or performed in a different order as desired.

At block 905, a transmitter antenna emits a signal (e.g., containing RF energy). In some cases, the transmitter antenna may be, may include, or may be a part of the transmitter circuitry 105 of FIG. 1. At block 910, an EBG isolator prevents a portion of the signal emitted by the transmitter antenna from coupling into a receiver antenna. For example, the EBG isolator may absorb the portion of the signal to prevent (e.g., eliminate, reduce, mitigate, attenuate) such coupling. The portion of the signal that is prevented from coupling into the receiver antenna may be considered as a parasitic/undesired signal to the receiver antenna. In an aspect, the signal emitted by the transmitter antenna includes a first component associated with a main lobe of the transmitter antenna, and one or more components associated with one or more side lobes of the transmitter antenna. The portion of the signal that is prevented from coupling into the receiver antenna by the EBG isolator may include some or all of the component(s) associated with the side lobe(s). In an aspect, the EBG isolator may prevent parasitic/undesired signals having various angles of incidence (e.g., including 90-degree angle of incidence) on the EBG isolator from coupling into (e.g., reaching) the receiver antenna. In some embodiments, the EBG isolator may be, may include, or may be a part of the EBG isolator 110 of FIG. 1. The receiver antenna may be, may include, or may be a part of the receiver circuitry 120 of FIG. 1.

Figure 10:
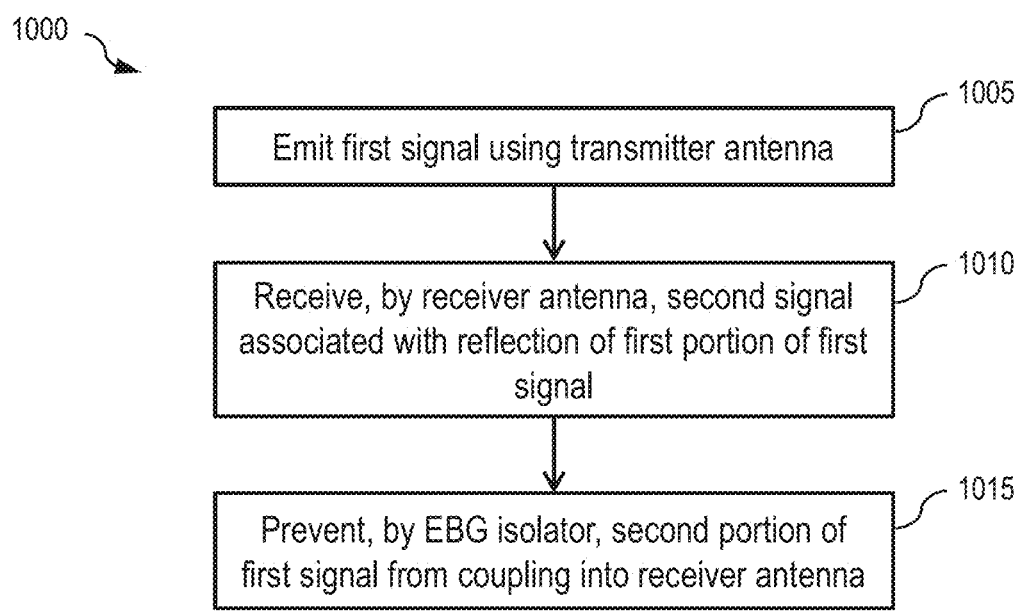
FIG. 10 illustrates a flow diagram of an example of a process for using a radar system in accordance with one or more embodiments of the present disclosure.

FIG. 10 illustrates a flow diagram of an example of a process 1000 for using a radar system in accordance with one or more embodiments of the present disclosure. For explanatory purposes, the process 1000 is described herein with reference to various components of FIG. 1; however, the process 1000 is not limited to various components of FIG. 1. Note that one or more operations may be combined, omitted, and/or performed in a different order as desired.

At block 1005, a transmitter antenna emits a first signal. In some cases, the transmitter antenna may be, may include, or may be a part of the transmitter circuitry 105 of FIG. 1. At block 1010, a receiver antenna receives a second signal associated with a reflection of a first portion of the first signal. For example, the second signal received by the receiver antenna may be a reflection, by an object, of the first portion of the first signal. In some cases, the receiver antenna may be, may include, or may be a part of the receiver circuitry 120 of FIG. 1.

At block 1015, an EBG isolator prevents a second portion (e.g., parasitic/undesired portion) of the first signal emitted by the transmitter antenna from coupling into the receiver antenna. For example, the EBG isolator may absorb the portion of the signal to prevent (e.g., eliminate, mitigate, attenuate) such coupling. In an aspect, the first portion of the first signal includes a signal (e.g., energy) of a main lobe of the transmitter antenna, and the second portion of the first signal includes one or more signals corresponding to one or more side lobes of the transmitter antenna. In an aspect, the EBG isolator may prevent parasitic/undesired signals having various angles of incidence (e.g., including 90-degree angle of incidence) on the EBG isolator from coupling into (e.g., reaching) the receiver antenna. In some embodiments, the EBG isolator may be, may include, or may be a part of the EBG isolator 110 of FIG. 1.

Figure 11A:
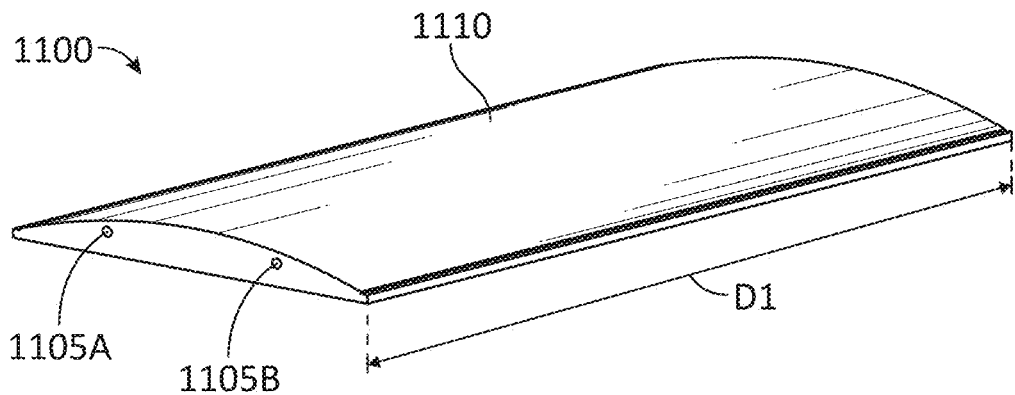
FIGS. 11A-11C illustrate various views of an example base support for an electromagnetic bandgap isolator device in accordance with one or more embodiments of the present disclosure.
Figure 11B:
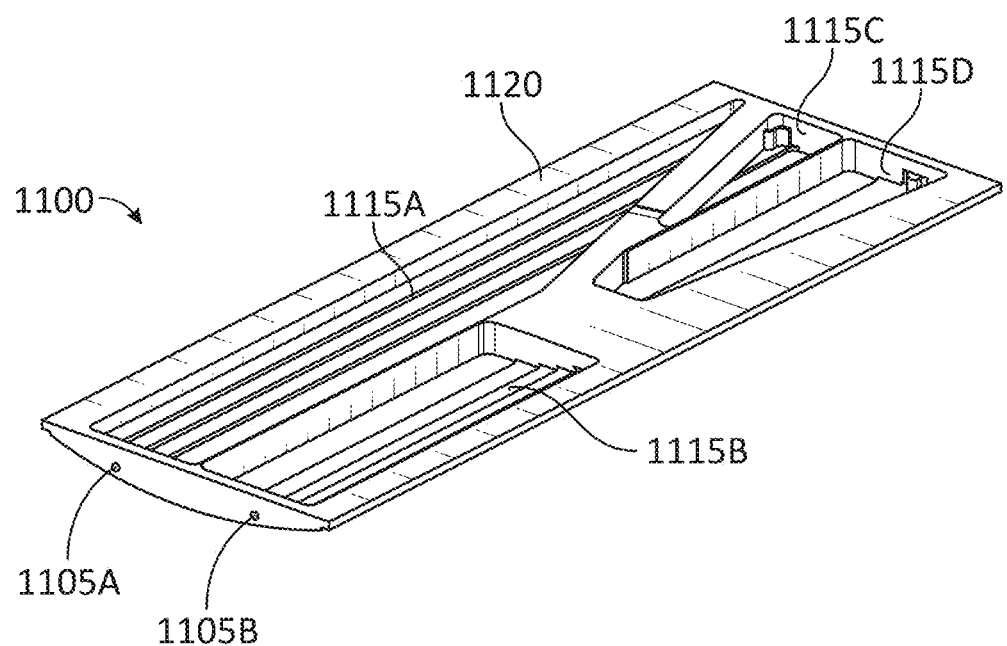
Figure 11C:
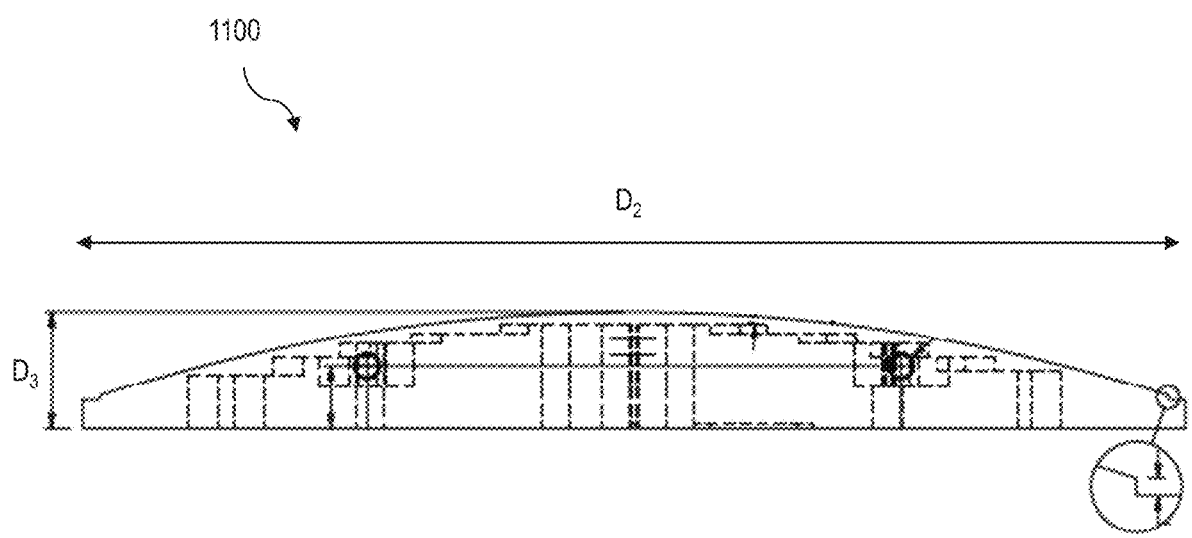

FIGS. 11A-C illustrate various views of an example base support 1100 for an EBG isolator device in accordance with one or more embodiments of the present disclosure. In some embodiments, the base support 1100 may be, may include, or may be a part of the base support 225 of FIG. 3. Not all of the depicted components may be required, however, and one or more embodiments may include additional components shown in the figures. Variations in the arrangement and type of the components may be made without departing from the spirit or scope of the claims as set forth herein. Additional components, different components, and/or fewer components may be provided.

As shown in FIG. 11A, the base support 1100 includes receiving interfaces 1105A and 1105B to allow coupling between an end support (e.g., the end support 205A of FIG. 2) and the base support 1100. The base support 1100 has a curved surface 1110 on which a metamaterial for the EBG isolator device may be glued or otherwise coupled to the base support 1100.

As shown in FIG. 11B, a base support side 1120 opposite of the curved surface 1110 may be substantially flat to facilitate attaching the EBG isolator device to a radar surface of a radar system. In one embodiment, the base support side 1120 has receptacles 1115A-D embedded therein to facilitate attachment of the base support 1100 to the radar surface (e.g., via corresponding receiving interfaces of the radar surface) and/or provide support for additional circuitry and/or hardware of the radar system.

In one example, the base support 1100 may have a length (denoted as $D_1$ in FIG. 11A) of approximately between 300 mm and 400 mm. In one example, the base support 1100 may have a width (denoted as $D_2$ in FIG. 11C) of approximately 100 mm to 150 mm. In one example, the base support 1100 may have a height (denoted as $D_3$ in FIG. 11C) of approximately between 10 mm to 15 mm. It is noted that the dimensions of the base support 1100 may be varied to be suitable for an intended application.

Figure 12A:
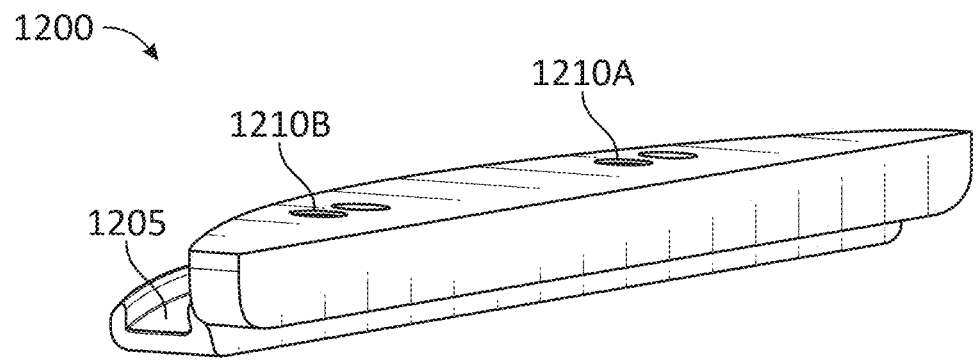
FIGS. 12A-12D illustrate various views of an example end support for an electromagnetic bandgap isolator device in accordance with one or more embodiments of the present disclosure.
Figure 12B:
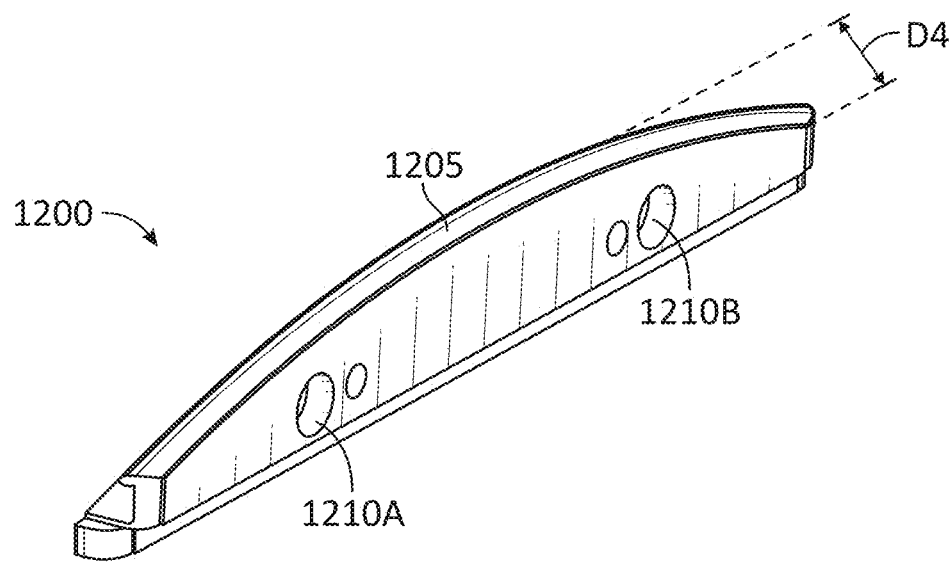
Figure 12C:
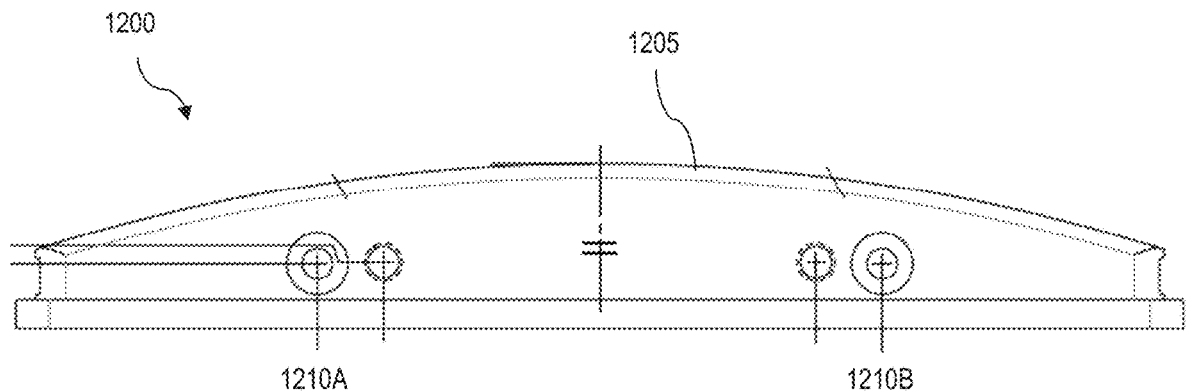
Figure 12D:
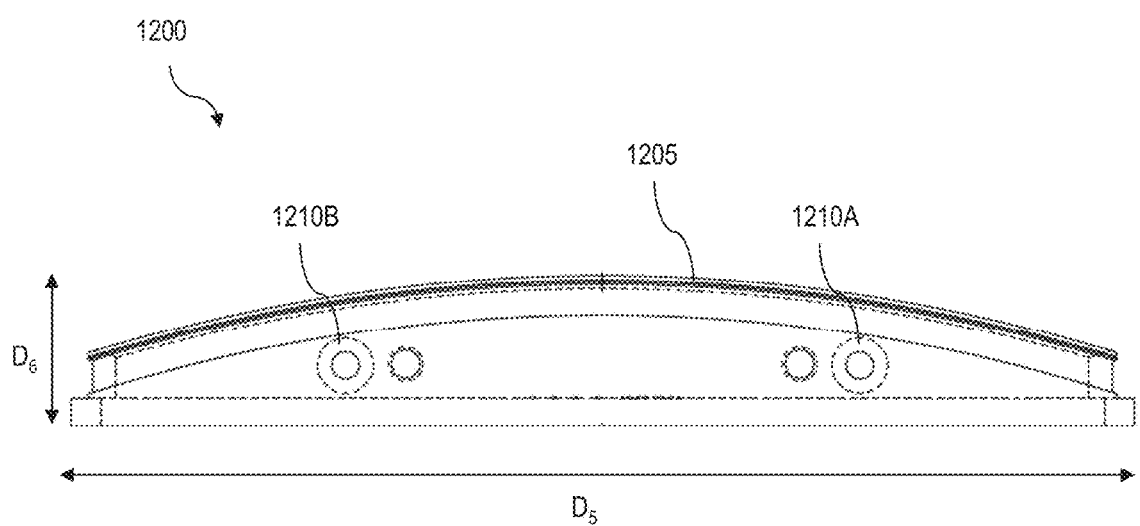

FIGS. 12A and 12B illustrate perspective views of an example end support 1200 for an EBG isolator device in accordance with one or more embodiments of the present disclosure. FIGS. 12C and 12D illustrate side views of the end support 1200 for the EBG isolator device in accordance with one or more embodiments of the present disclosure. In some embodiments, the end support 1100 may be, may include, or may be a part of end support 205A or 205B of FIG. 2. Not all of the depicted components may be required, however, and one or more embodiments may include additional components shown in the figures. Variations in the arrangement and type of the components may be made without departing from the spirit or scope of the claims as set forth herein. Additional components, different components, and/or fewer components may be provided.

As shown in FIG. 12A-12D, the end support 1200 includes openings 1210A and 1210B, whereby engagement elements may pass through to a receiving interface of a base support (e.g., the base support 225 of FIG. 3) to allow coupling between the end support 1200 and the base support. The end support has a lip 1205, which may be, may include, or may be a part of lip 230 of FIG. 2.

In one example, the end support 1200 may have a length (denoted as $D_4$ in FIG. 12B) of approximately between 5 mm and 7.5 mm. In one example, the end support 1200 may have a width (denoted as $D_5$ in FIG. 12D) of approximately between 100 mm and 150 mm. In one embodiment, the end support 1200 may have a height (denoted as $D_6$ in FIG. 12D) of approximately between 15 mm and 20 mm. It is noted that dimensions of the end support 1200 may be varied to be suitable for an intended application. For instance, the dimensions of the base support 1100 and the end support 1200 (and associated dimensions of other components of the EBG isolator, such as a metamaterial) may be varied as appropriate to accommodate a transmitter-receiver pair and associated radiation patterns.

It is noted that dimensional aspects provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect. Similarly, aspects related to distances between features provided above are also examples and also have associated tolerances.

Although the foregoing describes an EBG isolator primarily in the context of radar applications, in which the EBG isolator prevents coupling between a TX antenna and a RX antenna, the EBG isolator may be appropriately positioned between two devices (e.g., utilized for non-radar applications) to prevent coupling of signals emitted by one device from coupling into the other device.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. An electromagnetic bandgap isolator device, comprising:
    a base support having a curved surface; and
    a metamaterial comprising:
        a continuous curved layer in contact with the base support; and
        a plurality of grooves defined in the metamaterial, wherein the plurality of grooves are distributed along a width of the metamaterial and extend substantially along a length of the metamaterial, and wherein the metamaterial is configured to absorb energy associated with a frequency range.

2. The electromagnetic bandgap isolator device of claim 1, wherein the base support has a width, wherein the width of the base support and the width of the metamaterial extends along a direction, wherein the metamaterial comprises a plurality of metamaterial panels coupled to the continuous curved layer and distributed along the width of the base support, wherein adjacent panels of the plurality of metamaterial panels are at least partially separated along the direction by one of the plurality of grooves.

3. The electromagnetic bandgap isolator device of claim 2, wherein each of the plurality of metamaterial panels comprises:
    a plurality of conductive patches arranged in a two-dimensional array; and
    a plurality of vias, wherein each via couples a corresponding one of the plurality of conductive patches to the continuous curved layer.

4. The electromagnetic bandgap isolator device of claim 1, wherein the continuous curved layer comprises a continuous curved conductive layer, wherein the metamaterial further comprises:
    a plurality of conductive patches; and
    a plurality of vias, wherein each via couples a corresponding one of the plurality of conductive patches to the continuous curved conductive layer;
    wherein the frequency range is based on a dimension of the plurality of conductive patches, a distance between adjacent conductive patches of the plurality of conductive patches, and a dimension of the plurality of vias.

5. The electromagnetic bandgap isolator device of claim 1, further comprising at least one end support attached to the base support, wherein the at least one end support comprises a lip configured to hold the metamaterial in a fixed position, and wherein the energy is an undesired energy.

6. A method of manufacturing the electromagnetic bandgap isolator device of claim 1, the method comprising:
    providing the metamaterial; and
    coupling the metamaterial to the curved surface of the base support such that the metamaterial conforms to the curved surface of the base support.

7. The method of claim 6, further comprising grooving a layer of material having structures thereon to obtain the metamaterial.

8. The method of claim 7, further comprising coupling at least one end support to the base support to hold the metamaterial in a fixed position, wherein each of the structures comprises:
    a conductive patch; and
    a via that couples the conductive patch to the continuous curved layer.

9. A radar system comprising the electromagnetic bandgap isolator device of claim 1, the radar system further comprising:
    a transmitter configured to emit a signal, wherein the signal comprises a first portion and a second portion; and
    a receiver, wherein:
        the electromagnetic bandgap isolator device is disposed between the transmitter and the receiver, and
        the electromagnetic bandgap isolator device is configured to absorb the second portion of the signal.

10. A method of manufacturing the radar system of claim 9, the method comprising:
    providing the transmitter and the receiver; and
    disposing the electromagnetic bandgap isolator device between the transmitter and the receiver.

11. A method of using the electromagnetic bandgap isolator device of claim 1, the method comprising:
    emitting a signal using a transmitter antenna, wherein the signal comprises a first portion and a second portion; and
    absorbing, using the electromagnetic bandgap isolator device, the second portion of the transmitter antenna to prevent coupling of the second portion into a receiver antenna.

12. The method of claim 11, wherein the first portion is associated with a main lobe and one or more side lobes of the transmitter antenna and the second portion is associated with one or more additional side lobes of the transmitter antenna.

13. A radar system comprising:
    a transmitter configured to emit a signal, wherein the signal comprises a first portion and a second portion;
    a receiver; and
    an electromagnetic bandgap isolator device disposed between the transmitter and the receiver, wherein the electromagnetic bandgap isolator device is configured to absorb the second portion of the signal to prevent coupling of the second portion into the receiver, wherein the electromagnetic bandgap isolator device comprises a metamaterial having a plurality of grooves defined therein, wherein the plurality of grooves are distributed along a width of the metamaterial and extend substantially along a length of the metamaterial.

14. The radar system of claim 13, wherein the first portion is associated with a main lobe and one or more side lobes of the transmitter and the second portion is associated with one or more additional side lobes of the transmitter.

15. The radar system of claim 13, wherein the electromagnetic bandgap isolator device comprises:
a base support having a curved surface,
wherein the metamaterial further comprises:
- a continuous curved layer in contact with the base support, wherein the second portion of the signal has a frequency within a stop band of the metamaterial, wherein the continuous curved layer comprises a continuous curved conductive layer;
- a plurality of conductive patches; and
- a plurality of vias, wherein each via couples a corresponding one of the plurality of conductive patches to the continuous curved conductive layer.

16. A method comprising:
emitting, by a transmitter, a first signal comprising a first portion and a second portion;
receiving, by a receiver, a second signal, wherein the second signal is based on a reflection of the first portion by an object; and
absorbing, by an electromagnetic bandgap isolator device, the second portion of the first signal to prevent coupling of the second portion into the receiver, wherein the electromagnetic bandgap isolator device comprises a metamaterial having a plurality of grooves defined therein, and wherein the plurality of grooves are distributed along a width of the metamaterial and extend substantially along a length of the metamaterial.

17. The method of claim 16, wherein the first portion is associated with a main lobe of the transmitter and one or more side lobes of the transmitter and the second portion is associated with one or more additional side lobes of the transmitter.

18. The electromagnetic bandgap isolator device of claim 1, wherein the plurality of grooves extend substantially along an entirety of the length of the metamaterial.

19. The electromagnetic bandgap isolator device of claim 2, wherein a first metamaterial panel of the plurality of metamaterial panels is adjacent to only one of the plurality of grooves, wherein a second metamaterial panel of the plurality of metamaterial panels is adjacent to only one of the plurality of grooves, and wherein each remaining metamaterial panel of the plurality of metamaterial panels is adjacent to two of the plurality of grooves.

20. The electromagnetic bandgap isolator device of claim 2, wherein the metamaterial further comprises a plurality of portions disposed on the continuous curved layer, and wherein each of the plurality of portions is between and coupled to a respective pair of adjacent panels of the plurality of metamaterial panels.

* * * * *